United States Patent [19]
Knuth

[11] Patent Number: 5,646,979
[45] Date of Patent: Jul. 8, 1997

[54] CORDLESS TELEPHONE WITH VOICE ANNOUNCED CALLING PARTY IDENTIFICATION

[75] Inventor: Stephen B. Knuth, Mission Viejo, Calif.

[73] Assignee: Casio PhoneMate, Inc., Torrance, Calif.

[21] Appl. No.: 575,893

[22] Filed: Dec. 20, 1995

[51] Int. Cl.$^6$ .................................................. H04Q 7/20
[52] U.S. Cl. .............................................. 455/563; 379/67
[58] Field of Search .................................. 379/61, 67, 58

[56] References Cited

U.S. PATENT DOCUMENTS

| | | | |
|---|---|---|---|
| 4,650,931 | 3/1987 | Tsukada et al. | 379/61 |
| 4,672,660 | 6/1987 | Curtin . | |
| 4,894,861 | 1/1990 | Fujioka . | |
| 4,899,358 | 2/1990 | Blakely . | |
| 5,007,076 | 4/1991 | Blakely . | |
| 5,289,530 | 2/1994 | Reese . | |
| 5,511,111 | 4/1996 | Serbetcioglu et al. | 379/67 |
| 5,526,406 | 6/1996 | Luneau . | |

*Primary Examiner*—William Cumming
*Attorney, Agent, or Firm*—Frishauf, Holtz, Goodman, Langer & Chick

[57] ABSTRACT

A cordless telephone includes a base unit, a handset, a ring detector in the base unit for detecting ringing signals on a telephone line of an incoming telephone call from a central telephone office, and a line interface in the base unit for detecting the presence of caller information in the incoming telephone call, the caller information including at least a caller's telephone number. A caller identification detector in the base unit, connected to the line interface and to the ring detector, detects the caller information responsive to the ring detector detecting the ringing signals, and converts the caller information in the incoming telephone call to an identification signal. A speaker is provided in the handset. A speech synthesizer in the base unit converts the identification signal to a synthesized speech signal and transmits the synthesized speech signal to the speaker. A first controller in the base unit controls the ring detector, the line interface, the caller identification detector and the speech synthesizer such that at least the caller's telephone number is announced over the speaker in real time at the time of reception of the telephone call. Transmission/reception units are provided in the base unit and handset for transmitting signals between the base unit and handset.

10 Claims, 3 Drawing Sheets

CORDLESS TELEPHONE WITH VOICE ANNOUNCED CALLING PARTY IDENTIFICATION

BACKGROUND OF THE INVENTION

The present invention relates to calling party identification (CPID) services and, more particularly, is directed to a cordless telephone system that announces CPID information through a speaker in the handset.

Calling Party Identification (CPID) services are available to many telephone customers throughout the United States. Generally, the telephone customer will purchase a device that receives CPID signals from the central office of the telephone company, which indicate a caller's telephone number. This telephone number is displayed so that the called party can identify the caller and decide whether or not to take the call.

In a telephone system without message taking capability, real time delivery of CPID information is very desirable and useful. For this purpose, a multi-line liquid crystal display (LCD) and its attendant integrated driver circuit (IC) have been employed. However, this can be an expensive and difficult feature to implement in a cordless telephone, due to the size restrictions of the handset and the complex protocols necessary for digital transmission of the CPID data to the handset.

Announcement of calling party identification information using synthesized speech is well known in the art. However, there is no prior art that discloses a system for using speech synthesis or text-to-speech to announce CPID information from a cordless telephone handset. Thus, voice announcement of CPID information has been limited to using an adjunct unit or adding components to ordinary telephone equipment. Both options are likely to be costly and complex to implement.

U.S. Pat. No. 4,894,861 to Fujioka discloses a telephone system for audibly announcing calling party identification information if the caller's telephone number corresponds to one of a plurality of telephone numbers pre-registered by the user. Fujioka requires a separate keyboard and a key identification circuit for entering the information that will be announced when a specific party calls. In the preferred embodiment, Fujioka also requires a display. When a call is received, the central processing unit (CPU) checks the telephone number of the caller against the numbers stored in memory. When a match is made, the CPU transfers the ID information to a speech generator which converts the contents of the memory to speech signals and sends these signals to a speaker. If there is no coincidence with the information in memory, the CPU transfers only the originating subscriber's number or basic information such as "TELEPHONE CALL" to the speech generator. However, though Fujioka discloses the use of a memory pre-storing caller information, there is no real time transfer of caller name from the information transmitted along the telephone line.

U.S. Pat. No. 5,289,530 to Reese discloses a telephone system for remotely obtaining the calling party identification information of previous callers. The system converts stored CPID information into synthesized speech and communicates this information to a remote user in response to a predetermined DTMF code that the user enters from a remote telephone location, enabling the remote user to determine who has called him or her. Essentially, Reese adds a data receiver/decoder to a standard telephone set. This data receiver/decoder contains, among other things, an address decoder, a call progress detector, an on/off hook detector, a DTMF receiver-decoder and a tone generator. Reese thus discloses an apparatus that can be included as part of a telephone set or coupled to a telephone set as a separate, stand-alone unit. However, Reese does not teach or suggest supplying this information directly to a speaker at the local telephone at the time the call is received. In other words, Reese is lacking in three important aspects, namely (a) providing the speech synthesized information directly to a loudspeaker, (b) providing the voice announcement at the local telephone and (c) providing the voice announcement in real time at the time the call is received.

U.S. Pat. No. 4,672,660 to Curtin discloses an apparatus that uses speech synthesis to advise a user of a particular telephone number that is being called by the caller. A user of the apparatus would assign different telephone numbers to select individuals. When the individual calls one of the specific telephone numbers, the apparatus announces which number is being called, so that the user will know the identity of the caller. The system of Curtin requires that the user remember which telephone number he or she assigned to a particular calling party. It also requires that the user have five to ten different telephone numbers on a single telephone line.

U.S. Pat. Nos. 4,899,358 and 5,007,076 to Blakely disclose an apparatus that uses a text-to-speech unit to generate speech signals for the announcement of a name of a calling party (from a database search). The CPID information can be spoken in place of or in addition to the ringing signal. Similar to Fujioka, the system of Blakely requires a data base search to identify the calling party's name based on CPID information received from the telephone company's central office.

SUMMARY OF THE INVENTION

It is an object of the present invention to provide a cordless telephone with voice announced calling party identification.

It is another object of the present invention to provide a cordless telephone that announces CPID information through an earpiece or a loudspeaker in the handset.

It is still another object of the present invention to provide a cordless telephone with an already existing speakerphone that allows the CPID voice announcement feature to be added without significantly increasing the cost or complexity of the cordless telephone.

It is yet another object of the present invention to provide a cordless telephone that announces CPID information through an earpiece in the handset if the handset is off hook and if the owner subscribes to a call waiting service.

Specifically, caller ID information, including at least the caller's telephone number, is transmitted from a central office to the cordless telephone base unit where it is detected by a caller ID detector. The base unit then transmits a command, via radio frequency (RF), instructing the handset to turn on its speaker means. A speech synthesizer in the base unit first converts the caller ID information to speech. The synthesized speech is broadcast over the speaker means located in the cordless handset. The speaker means may be the same loudspeaker that is used when the handset is in speakerphone mode. Alternately, the speaker means may be the earpiece in the cordless handset, if a loudspeaker is not available or if the user subscribes to a call waiting service.

In accordance with the present invention, a cordless telephone includes ring detector means for detecting ringing signals on a telephone line of an incoming telephone call from a central telephone office; line interface means for detecting the presence of caller information in said incoming telephone call, said caller information including at least a caller's telephone number, caller identification detector means, connected to said line interface means and said ring detector means, for detecting said caller information responsive to said ring detector means detecting said ringing signals, and for converting said caller information in said incoming telephone call to an identification signal; a speaker means; speech synthesizer means for converting said identification signal to a synthesized speech signal and for transmitting said synthesized speech to said speaker means; and controller means for controlling said ring detector means, said line interface means, said caller identification detector means and said speech synthesizer means such that at least the caller's telephone number is announced over said speaker means in real time at the time of reception of said telephone call when a caller ID/ring mode is set.

The cordless telephone includes a base unit and a handset. The base unit contains the ring detector means, line interface means, caller identification detector means and speech synthesizer means. The handset contains the speaker means. Further, the controller means includes a first controller in the base unit which controls the ring detector means, line interface means, caller identification detector means and speech synthesizer means, and a second controller in the handset which controls the speaker means.

The cordless telephone also includes first radio frequency transmission/reception means in the base unit for transmitting the synthesized speech signal to the handset, and second radio frequency transmission/reception means in the handset for receiving the transmitted synthesized speech signal and supplying the transmitted synthesized speech signal to the second controller.

As is conventional, the cordless telephone includes a receiver having an earpiece and a microphone.

Output switch means is provided for selectively connecting an audio output of the second radio frequency transmission/reception means to one of (a) the earpiece, and (b) a loudspeaker. The output switch means is controlled by the second controller.

A mode switch means, controlled by the second controller, is also provided for switching the handset to be in one of (a) a caller ID/ring mode in which the ringing signal corresponding to a first few rings is replaced by the synthesized speech signal to cause the speaker means to announce at least the caller's telephone number, and (b) a ring only mode in which the ringing signal is directly supplied to the speaker means without the speaker means announcing at least the caller's telephone number.

Preferably, when the caller ID/ring mode is set, the speech synthesizer means causes the speaker means to announce at least the caller's telephone number at the time of reception of the telephone call.

The above and other objects, features and advantages of the present invention will become readily apparent from the following detailed description which is to be read in conjunction with the accompanying drawings.

DETAILED DESCRIPTION

Figure 1:
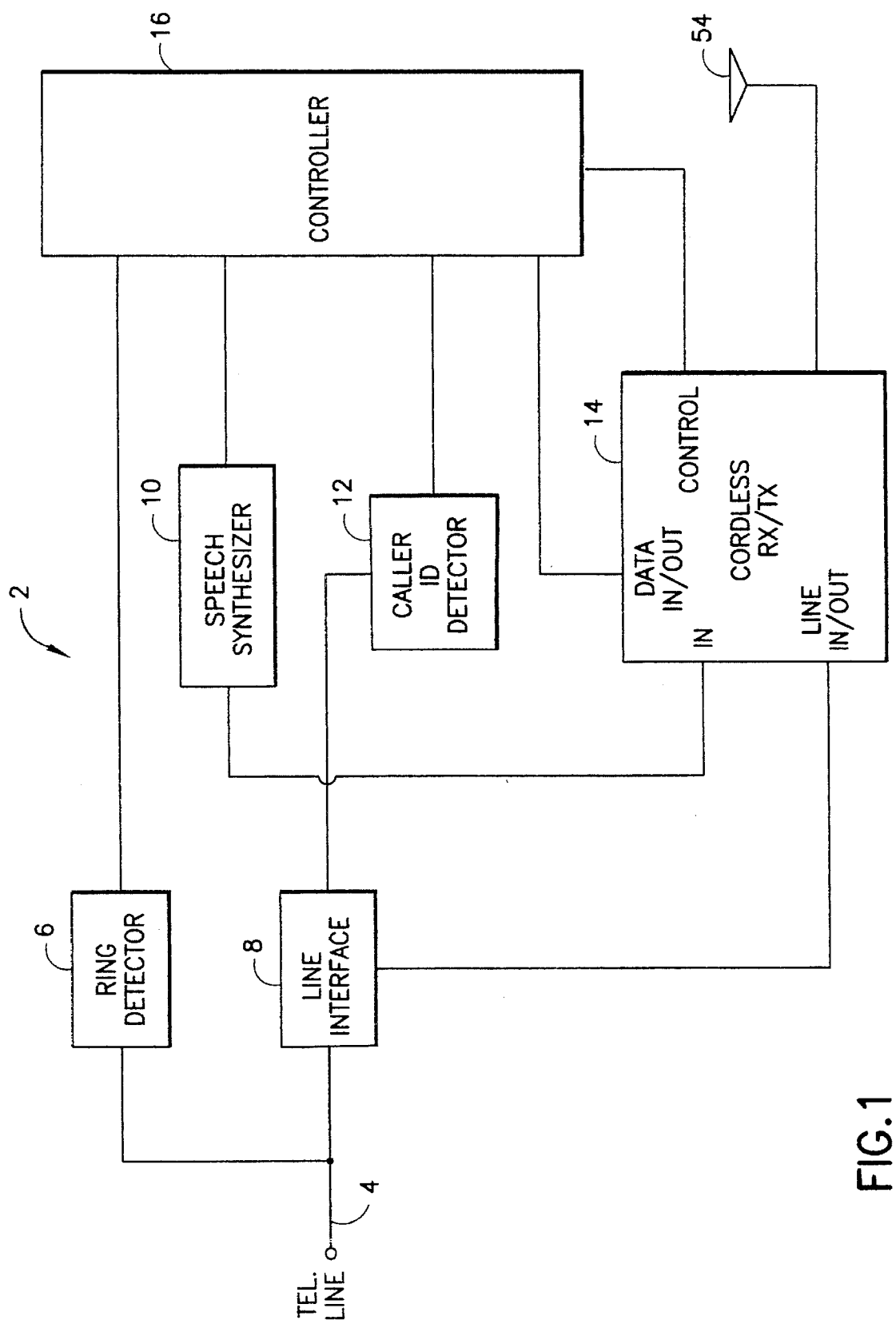
FIG. 1 is a generalized block diagram of a cordless telephone base unit in accordance with the present invention.

Referring to the drawings in detail, and initially to FIG. 1 thereof, there is shown a block diagram of the base unit 2 of the cordless telephone of the present invention. A ring detector 6 and a line interface 8 are connected with a telephone line 4.

Ring detector 6 monitors telephone line 4 for the detection of ringing signals sent from the central office, and supplies a signal to a controller 16 in response thereto. Line interface 8, on the other hand, is provided to detect the presence of information such as the tone signals, caller's telephone number and the like sent along telephone line 4. The signals detected by line interface 8 are supplied to a caller ID detector 12. When a ring occurs, caller ID detector 12 detects information, such as the telephone number of the caller sent along telephone line 4, and supplies this information to controller 16.

A speech synthesizer 10 is connected with controller 16. When the ring detector 6 detects a ringing signal, the caller ID detector 12 detects the caller information, converts the caller information to an information signal, and supplies the information signal to controller 16. Controller 16, in turn, sends the information signal to speech synthesizer 10, which converts the information signal to a synthesized speech signal. Then, speech synthesizer 10 sends synthesized speech signal to a cordless RX/TX unit (RF block) 14.

Controller 16 thereby controls the operations of ring detector 6, line interface circuit 8, speech synthesizer 10, caller ID detector 12, and RF block 14.

Figure 2:
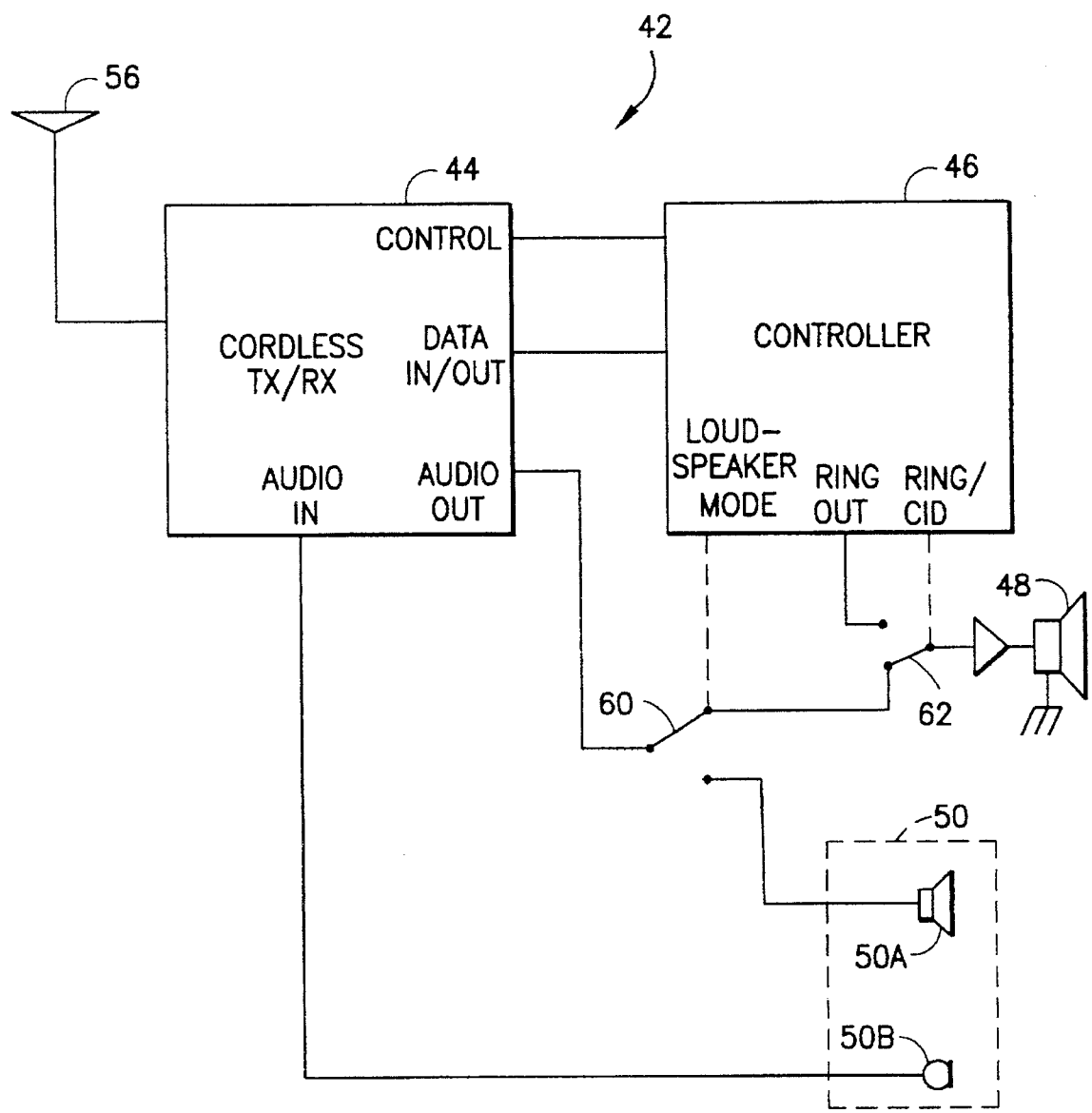
FIG. 2 is a generalized block diagram of a cordless telephone handset having a loudspeaker in accordance with the present invention.

Cordless RX/TX unit 14 then transmits the synthesized speech signal through an antenna 54, by way of radio frequencies, to a cordless RX/TX unit (RF block) 44 in the handset 42 of the cordless telephone, as shown in FIG. 2. The cordless RX/TX unit (RF block 44) receives the synthesized speech signal via an antenna 56. The signal supplied to cordless RX/TX unit 44 is controlled by a controller 46 in handset 42, so as to selectively supply the same to a loudspeaker 48 in handset 42 in a ring/CID (caller ID) mode, thereby replacing the first few rings. The loudspeaker 48 is the same loudspeaker that is used when the handset 42 is set in speakerphone mode.

Controller 46 also controls a receiver 50 in handset 42, with receiver 50 including an earpiece 50A and a microphone 50B. Microphone 50B is connected with the AUDIO IN terminal of RX/TX unit 44, while earpiece 50A is selectively connected or disconnected from the AUDIO OUT terminal of RX/TX unit 44. The RX/TX unit 44 is also capable of sending the audio information to loudspeaker 48 through a switch, which will be described later.

Cordless telephones with handset speakerphones are becoming increasingly popular. By adding a modem IC to receive the CPID signals from the telephone company's central office and a speech synthesis IC, the present invention enables a voice announcement of CPID information to such a cordless telephone system. In the case of the present invention, the first few rings are replaced by speech. A typical sequence in response to an incoming ring would be as follows:

"Hello, you have a telephone call from '555-1234', ring-ring..."

The present invention can also be implemented with a cordless telephone system without the handset speakerphone feature by adding a loudspeaker to the handset for such a purpose. In such a case, the present invention would still maintain a significant cost/complexity advantage over a visual method.

Therefore, information regarding the caller's telephone number which is sent along the telephone line from the central station to the local telephone location, can be sent to a loudspeaker at the local telephone location in real time, prior to the user at such local telephone station picking up the telephone.

It will be appreciated that cordless handset 42 of the present invention has four "modes", the operation of these modes being controlled by controller 46 in response to user activated output switch 60 and mode switch 62. When a user is speaking to another party, output through the cordless handset can either be through the loudspeaker 48 (speakerphone mode) or earpiece 50A of the handset (regular talk mode), as determined by output switch 60. The handset can also either be set in a ring only mode or a caller ID/ring mode, as determined by mode switch 62. In the case of the caller ID/ring mode, the first few rings are replaced by "spoken" caller ID information, including at least the caller's telephone number. In the case of the ring only mode, the ringing signal is directly supplied to the loudspeaker without the loudspeaker announcing at least the caller's telephone number.

It will also be appreciated that the cordless telephone of the present invention may also operate compatibly with call waiting services. When the cordless handset 42 is set in the caller ID/ring mode, and the cordless handset 42 is off hook with the user speaking to another party, if a second call comes in, the first few tones of the conventional call waiting signal indicating the second call will be replaced by "spoken" caller ID information, including at least the second caller's telephone number. In such case, the caller ID information will be announced through the loudspeaker 48 if the speakerphone mode is set, or through the earpiece 50A if the regular talk mode is set.

Figure 3:
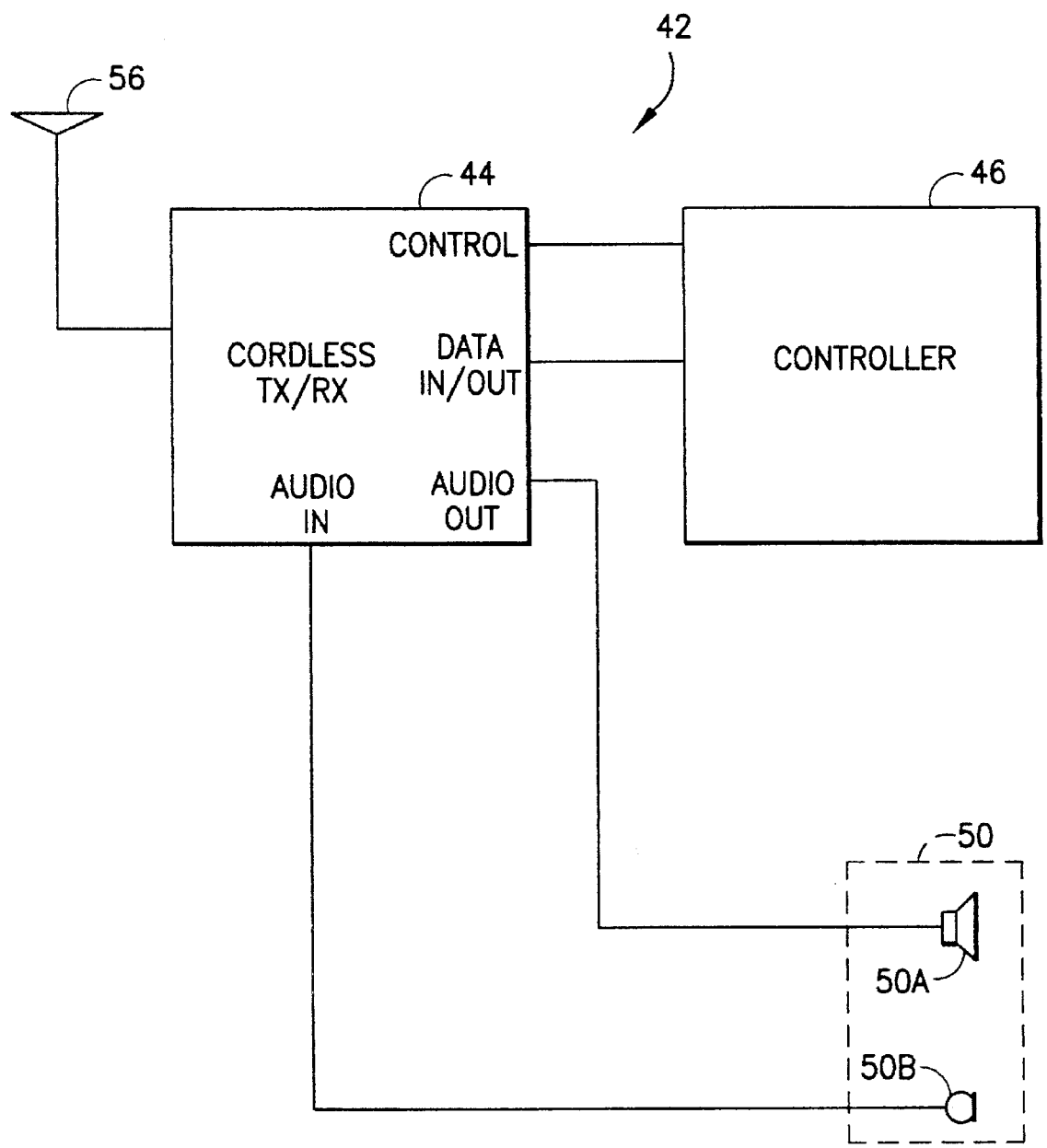
FIG. 3 is a generalized block diagram of a cordless telephone handset without a loudspeaker in accordance with another embodiment of the present invention.

It will still further be appreciated that, as shown in FIG. 3, the cordless telephone of the present invention need not include a speakerphone function and that the loudspeaker 48 shown in the embodiment of FIG. 2 may be omitted. In such case, the cordless telephone will operate essentially in the same manner described hereinabove with respect to the embodiment of FIG. 2, except that caller ID information will be announced only through earpiece 50A instead of through loudspeaker 48. Earpiece 50A is the same speaker means used when the handset is set in the regular talk mode.

Having described a specific preferred embodiment of the invention with reference to the accompanying drawings, it will be appreciated that the present invention is not limited to that precise embodiment, and that various changes and modifications can be effected therein by one skilled in the art without departing from the spirit or scope of the invention, as defined by the appended claims.

What is claimed is:

1. A cordless telephone comprising:
    a handset including a receiver and a speaker device, said speaker device including a loudspeaker and an earpiece;
    a base unit including:
        a ring detector which detects ringing signals on a telephone line of an incoming telephone call from a central telephone office;
        a line interface which detects the presence of caller information in said incoming telephone call, said caller information including at least a caller's telephone number;
        a caller identification detector, coupled to said line interface, which detects said caller information responsive to said ring detector detecting said ringing signals, and which converts said caller information in said incoming telephone call to an identification signal;
        a speech synthesizer which converts said identification signal to a synthesized speech signal and which transmits said synthesized speech to said speaker device;
        a first controller which controls said ring detector, said line interface, said caller identification detector and said speech synthesizer such that at least the caller's telephone number is announced over said speaker device in real time at the time of reception of said telephone call when a caller ID/ring mode is set;
        a first radio frequency transmitter/receiver in said base unit which transmits said synthesized speech signal to said handset; and
    said handset further includes:
        a second controller which controls said loudspeaker;
        a second radio frequency transmitter/receiver which receives said transmitted synthesized speech signal and which supplies said transmitted synthesized speech signal to said second controller;
        an output switch unit which selectively connects an audio output of said second radio frequency transmitter/receiver to one of (a) said earpiece and (b) said loudspeaker.

2. A cordless telephone according to claim 1, wherein said output switch unit is controlled by said second controller.

3. A cordless telephone comprising:
    a handset including a speaker device, said speaker device including a loudspeaker;
    a base unit including:
        a ring detector which detects ringing signals on a telephone line of an incoming telephone call from a central telephone office;
        a line interface which detects the presence of caller information in said incoming telephone call, said caller information including at least a caller's telephone number;
        a caller identification detector, coupled to said line interface, which detects said caller information responsive to said ring detector detecting said ringing signals, and which converts said caller information in said incoming telephone call to an identification signal;
        a speech synthesizer which converts said identification signal to a synthesized speech signal and which transmits said synthesized speech to said speaker device;
    a controller which controls said ring detector, said line interface, said caller identification detector and said speech synthesizer such that at least the caller's telephone number is announced over said speaker device in real time at the time of reception of said telephone call when a caller ID/ring mode is set; and
    a mode switch, controlled by said controller, and which switches said handset to be set in one of:
        (a) a caller ID/ring mode in which the ringing signal corresponding to a first few rings is replaced by the synthesized speech signal to cause said loudspeaker to announce at least the caller's telephone number; and (b) a ring only mode in which the ringing signal is directly supplied to said loudspeaker without said loudspeaker announcing at least the caller's telephone number.

4. A cordless telephone according to claim 3, wherein said speech synthesizer causes said loudspeaker to announce at least the caller's telephone number in real time at the time of reception of said telephone call when the caller ID/ring mode is set.

5. A cordless telephone according to claim 4, wherein, when a second telephone call comes in from the central telephone office, said speech synthesizer announces at least the second caller's telephone number in real time at the time of reception of said second telephone call through an earpiece in said handset when said handset is set in the caller ID/ring mode and said handset is not set in a speakerphone mode.

6. A cordless telephone according to claim 4, wherein, when a second telephone call comes in from the central telephone office, said speech synthesizer causes said loudspeaker to announce at least the second caller's telephone number in real time at the time of reception of said second telephone call when said handset is both set in the caller ID/ring mode and set in a speakerphone mode.

7. A cordless telephone comprising:

a handset including a speaker device, said speaker device including a loudspeaker;

a base unit including:

a ring detector which detects ringing signals on a telephone line of an incoming telephone call from a central telephone office;

a line interface which detects the presence of caller information in said incoming telephone call, said caller information including at least a caller's telephone number;

a caller identification detector, coupled to said line interface, which detects said caller information responsive to said ring detector detecting said ringing signals, and which converts said caller information in said incoming telephone call to an identification signal;

a speech synthesizer which converts said identification signal to a synthesized speech signal and which transmits said synthesized speech to said speaker device;

a first controller which controls said ring detector, said line interface, said caller identification detector and said speech synthesizer such that at least the caller's telephone number is announced over said speaker device in real time at the time of reception of said telephone call when a caller ID/ring mode is set;

said handset further includes a second controller which controls said loudspeaker;

a mode switch, controlled by said second controller, and which switches said handset to be set in one of:

(a) a caller ID/ring mode in which the ringing signal corresponding to a first few rings is replaced by the synthesized speech signal to cause said loudspeaker to announce at least the caller's telephone number; and (b) a ring only mode in which the ringing signal is directly supplied to said loudspeaker without said loudspeaker announcing at least the caller's telephone number.

8. A cordless telephone according to claim 7, wherein said speech synthesizer causes said loudspeaker to announce at least the caller's telephone number in real time at the time of reception of said telephone call when said handset is set in the caller ID/ring mode.

9. A cordless telephone according to claim 8, wherein, when a second telephone call comes in from the central telephone office, said speech synthesizer announces at least the second caller's telephone number in real time at the time of reception of said second telephone call through an earpiece in said handset when said handset is set in the caller ID/ring mode and said handset is not set in a speakerphone mode.

10. A cordless telephone according to claim 8, wherein, when a second telephone call comes in from the central telephone office, said speech synthesizer causes said loudspeaker to announce at least the second caller's telephone number in real time at the time of reception of said second telephone call when said handset is set both in the caller ID/ring mode and set in a speakerphone mode.

* * * * *